United States Patent [19]

Noguchi et al.

[11] 4,174,679
[45] Nov. 20, 1979

[54] INTERNAL COMBUSTION ENGINE WITH A SUBSIDIARY COMBUSTION CHAMBER

[75] Inventors: Masaaki Noguchi, Nagoya; Shougo Sanda, Numazu; Masaaki Takizawa, Mishima, all of Japan

[73] Assignee: Toyota Jidosha Kogyo Kabushiki Kaisha, Toyota, Japan

[21] Appl. No.: 867,881

[22] Filed: Jan. 9, 1978

Related U.S. Application Data

[63] Continuation of Ser. No. 704,505, Jul. 12, 1976, abandoned.

[30] Foreign Application Priority Data

May 27, 1976 [JP] Japan .................................. 51-60557

[51] Int. Cl.² .............................................. F02B 19/08
[52] U.S. Cl. ............................ 123/30 D; 123/32 SP; 123/191 S
[58] Field of Search ............ 123/30 D, 32 ST, 32 SP, 123/191 S, 191 SP

[56] References Cited

U.S. PATENT DOCUMENTS

| | | | |
|---|---|---|---|
| 1,422,794 | 7/1922 | Smith | 123/32 SP |
| 1,555,809 | 9/1925 | Burtnett | 123/191 S |
| 1,596,240 | 8/1926 | Dikeman | 123/32 SP |
| 2,127,512 | 8/1938 | Harper | 123/169 |
| 2,741,229 | 4/1956 | Stump | 123/32 C |
| 2,808,036 | 10/1957 | Seggern et al. | 123/32 CY |
| 2,826,187 | 3/1958 | Meyer | 123/191 SP |
| 3,230,939 | 1/1966 | Goossak | 123/32 SP |
| 3,890,940 | 6/1975 | List | 123/191 SP |
| 3,924,584 | 12/1975 | Decker | 123/191 SP |
| 4,038,959 | 8/1977 | Takizawa et al. | 123/191 S |
| 4,092,969 | 6/1978 | Ono et al. | 123/32 SP |

FOREIGN PATENT DOCUMENTS

| | | | |
|---|---|---|---|
| 18616M | 1/1956 | Fed. Rep. of Germany | 123/32 SP |
| 2537041 | 3/1977 | Fed. Rep. of Germany | 123/30 D |
| 962632 | 6/1950 | France | 123/30 D |

Primary Examiner—Charles J. Myhre
Assistant Examiner—Craig R. Feinberg
Attorney, Agent, or Firm—Stevens, Davis, Miller & Mosher

[57] ABSTRACT

An internal combustion engine comprising a subsidiary combustion chamber connected to a main combustion chamber via a connecting passage. The subsidiary combustion chamber is divided into a first chamber and a second chamber by an annular raised portion formed on the subsidiary combustion chamber. The connecting passage communicates the main combustion chamber with the first chamber for leading a combustible mixture from the main combustion chamber into the first chamber and is arranged so as to create a swirl motion of the combustible mixture in the first and the second chambers. When the combustible mixture is ignited, the annular raised portion serves to prevent outflow of an unburned mixture from the second chamber to the first chamber.

3 Claims, 2 Drawing Figures

INTERNAL COMBUSTION ENGINE WITH A SUBSIDIARY COMBUSTION CHAMBER

This is a continuation of application Ser. No. 704,505 filed July 12, 1976, now abandoned.

DESCRIPTION OF THE INVENTION

The present invention relates to an internal combustion engine having a subsidiary combustion chamber connected to a main combustion chamber via a connecting passage.

An internal combustion engine with a subsidiary combustion chamber is known in which a combustion chamber comprises a main combustion chamber and a subsidiary combustion chamber. The main and the subsidiary combustion chambers are interconnected via a connecting passage. The spark gap of a spark plug is located in the subsidiary combustion chamber. At the time of the compression stroke, an air-fuel mixture, particularly a lean air-fuel mixture introduced into the main combustion chamber is pushed into the subsidiary combustion chamber via the connecting passage, and then the air-fuel mixture is ignited to burn in the subsidiary combustion chamber. Then a high velocity burning jet is injected into the main combustion chamber from the connecting passage, whereby the high velocity burning jet causes combustion of the air-fuel mixture in the main combustion chamber.

In an internal combustion engine of this type, there is an advantage such that, since the initially ignited part of the air-fuel mixture in the subsidiary combustion chamber is confined for a long time in the subsidiary combustion chamber until said initially ignited part reaches the outlet of the subsidiary combustion chamber, that is, the connecting passage, the pressure in the subsidiary combustion chamber sufficiently increases, whereby a strong high velocity burning jet can be obtained. There is a further advantage such that, since the ignition timing scarcely influences the ease of ignition, the ignition timing can be set so that the spark plug is operated in the vicinity of an ignition timing in which the rate of fuel consumption is low and the engine can develop maximum torque. However, contrary to this, there are various drawbacks as follows.

(a) The pressure in the subsidiary combustion chamber increases extraordinarily, thus, causing a violent combustion in the subsidiary combustion chamber, whereby the combustion in the subsidiary combustion chamber is completed in a short time. As a result of this, the high velocity burning jet does not continue to be injected into the main combustion chamber until the combustion in the main combustion chamber has been completed. Consequently, a reduction in the effectiveness of the high velocity burning jet for quickening the speed of the combustion in the main combustion chamber occurs, thus producing a great amount of harmful components.

(b) The violent combustion in the subsidiary combustion chamber causes a combustion noise.

(c) Since unburned gas is injected into the main combustion chamber from the connecting passage at the start of the period of combustion in the subsidiary combustion chamber, the entire volume of the subsidiary combustion chamber cannot be fully used for creating a strong high velocity burning jet.

An object of the present invention is to eliminate the above-mentioned drawbacks.

According to the present invention, there is provided an internal combustion engine comprising, a cylinder having a cylinder block and a cylinder head fixed onto said cylinder block, a piston reciprocally movable in said cylinder block, a main combustion chamber formed between a top surface of said piston and an inner surface of said cylinder head, a cylinder head bore defining a subsidiary combustion chamber symmetrically extending about an axis, said subsidiary combustion chamber comprising a first chamber arranged near to the main combustion chamber, a second chamber arranged remote from said main combustion chamber, and a restricted opening means interconnecting said first chamber with said second chamber, said first chamber, said restricted opening means and said second chamber being arranged in this order on the symmetrical axis of said subsidiary combustion chamber, a passage means connecting said main combustion chamber with said first chamber for leading a combustible mixture from said main combustion chamber into said first chamber and arranged so as to create a swirl motion of said combustible mixture in said first and said second chambers, and a spark plug having a spark gap located in the vicinity of said symmetrical axis in said subsidiary combustion chamber, said restricted opening means allowing outflow of a combustion gas from said second chamber to said first chamber, said combustion gas being collected in the vicinity of said symmetrical axis after said combustible mixture is ignited, while said restricted opening means prevents outflow of an unburned mixture from said second chamber to said first chamber, said unburned mixture being collected on the peripheral region in said second chamber remote from said symmetrical axis due to the centrifugal force caused by said swirl motion of said combustible mixture.

The above-mentioned object of the present invention may be more fully understood from the following descriptions of a preferred embodiment of the invention, together with the accompanying drawings.

DESCRIPTION OF A PREFERRED EMBODIMENT

Figure 1:
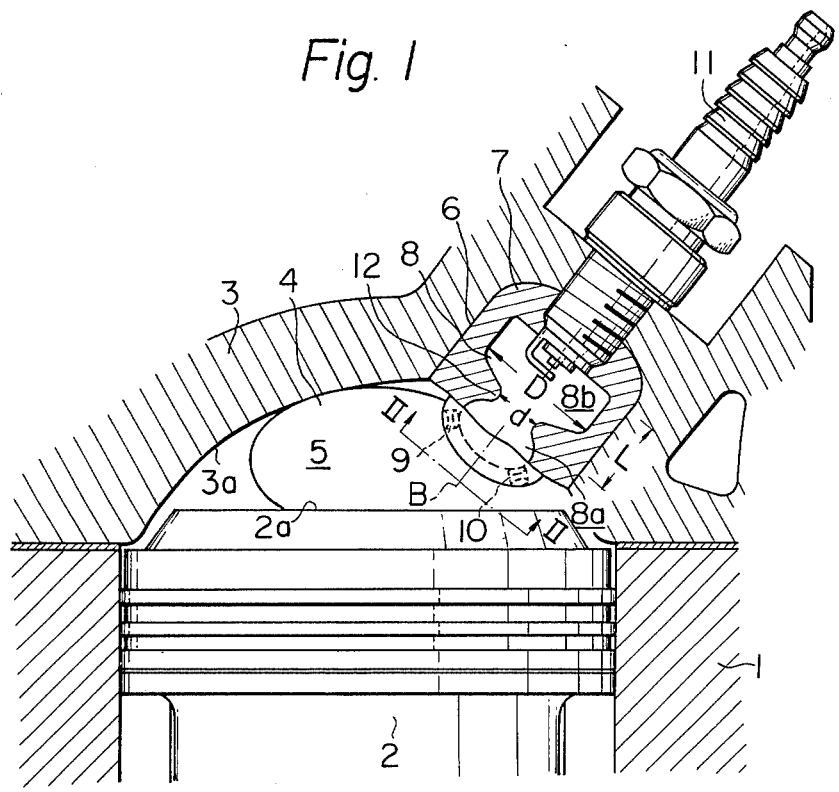
FIG. 1 is a cross-sectional side view of an internal combustion engine according to the present invention.

Referring to FIG. 1, an internal combustion engine comprises a cylinder block 1, a piston 2 reciprocally movable in the cylinder block 1, a cylinder head 3 fixed onto the cylinder block 1, an intake valve 4, an exhaust valve (not shown), a main combustion chamber 5 formed between the inner wall 3a of the cylinder head 3 and the top surface 2a of the piston 2, a subsidiary chamber component 7 press-fitted into a recess 6 formed in the cylinder head 3, a subsidiary combustion chamber 8 formed in the subsidiary chamber component 7, connecting passages 9 and 10 communicating the main combustion chamber 5 with the subsidiary combustion chamber 8, and a spark plug 11 having a spark gap located in the subsidiary combustion chamber 8. According to the present invention, the subsidiary combustion chamber 8 has on its inner surface an annular raised portion 12 which forms a circular-shaped restricted opening having a diameter of d. The subsidiary combustion chamber 8 is divided into a first subsidiary chamber 8a and a second subsidiary chamber 8b by the restricted opening. The first subsidiary chamber 8a is connected to the main combustion chamber 5 via two connecting passages 9 and 10. These connecting passages 9 and 10 are respectively arranged so as to extend in the tangential direction of the inner peripheral wall of the first subsidiary chamber 8a so that an air-fuel mixture introduced into the first subsidiary chamber 8a from the main combustion chamber 5 via the connecting passages 9 and 10 at the time of the compression stroke is swirled in the first subsidiary chamber 8a as indicated by arrow A in FIG. 2.

Figure 2:
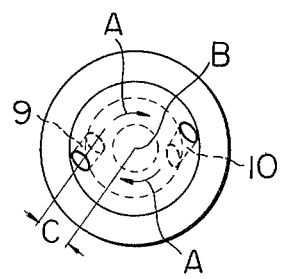
FIG. 2 is a view taken along the line II—II in FIG. 1.

In FIG. 2, in order to create a strong swirl motion, it is preferable that the distance C between the central axis B of the subsidiary combustion chamber 8 and the axis of the connecting passages 9 and 10 be as large as possible. However, if the volume of the first subsidiary chamber 8a is enlarged, then the unburned mixture in the first subsidiary chamber 8a would be injected into the main combustion chamber 5 when the air-fuel mixture in the second subsidiary chamber 8b is ignited. In order to avoid the injection of the unburned mixture, the volume of the first subsidiary chamber 8a is required to be smaller than that of the second subsidiary chamber 8b. Consequently, by taking the above-mentioned circumstance into consideration, the distance C is decided. The spark gap of the spark plug 11 is located in the vicinity of the central axis B in the second subsidiary chamber 8b having a diameter of D. However, as is hereinafter mentioned, the spark gap of the spark plug 11 may be located at any other position in the vicinity of the central axis B in the subsidiary combustion chamber 8.

An air-fuel mixture, particularly a lean air-fuel mixture, is introduced into the main combustion chamber 5 via the intake valve 4 during the intake stroke. Then, the air-fuel mixture is pushed into the first subsidiary chamber 8a via the connecting passages 9 and 10 at the time of the compression stroke. At this time, a strong swirl of the air-fuel mixture turning around the central axis B is created in the first subsidiary chamber 8a. Then, the air-fuel mixture is pushed into the second subsidiary chamber 8b through the restricted opening while continuing to swirl, and thus a swirl of the air-fuel mixture turning around the central axis B is also created in the second subsidiary chamber 8b. When the piston 2 reaches the vicinity of the top dead center, the air-fuel mixture in the subsidiary combustion chamber 8 is ignited by the spark plug 11. As is aforementioned, the air-fuel mixture in the subsidiary combustion chamber 8 rotates around the central axis B. Consequently, the speed of the air-fuel mixture is nearly equal to zero on the central axis B, whereby the air-fuel mixture is easily ignited.

After the air-fuel mixture is ignited, since the air-fuel mixture rotates around the central axis B, the combustion gas having a high temperature and, hence, a small specific weight is collected in the vicinity of the center of the swirl, that is, around the central axis B due to a centrifugal force. On the other hand, the unburned mixture having a low temperature and, hence, a large specific weight, is collected in the vicinity of the periphery of the swirl, that is, on the peripheral inner wall of the second subsidiary chamber 8b. The combustion gas having a high temperature in the second subsidiary chamber 8b is spread into the first subsidiary chamber 8a via the restricted opening, whereby a high velocity burning jet is injected into the main combustion chamber 5 via the connecting passages 9 and 10. As is aforementioned, the annular raised portion 12 forming the restricted opening is formed between the first subsidiary chamber 8a and the second subsidiary chamber 8b. Consequently, the combustion gas having a high temperature and collected on the central axis B in the second subsidiary chamber 8b can be delivered into the first subsidiary chamber 8a via the restricted opening, while the unburned mixture collected on the peripheral inner wall of the second subsidiary chamber 8b remote from the central axis B is prevented from flowing into the first subsidiary chamber 8a due to the presence of the annular raised portion 12. Thus, no unburned mixture is injected into the main combustion chamber 5 from the connecting passages 9 and 10 when the air-fuel mixture in the second subsidiary chamber 8b is ignited. According to the experiment tried by inventors, in order to prevent the injection of the unburned mixture into the main combustion chamber 5 as is aforementioned, the ratio d/D of the diameter d of the restricted opening to the diameter D of the second subsidiary chamber 8b is required to be less than 0.8, and the ratio D/L of the diameter D of the second subsidiary chamber 8b to the axial length L of the second subsidiary chamber 8b (said axial length L is defined by a distance between the inner wall of the second subsidiary chamber 8b remote from the first subsidiary chamber 8a and the position in which the diameter of the restricted opening is minimum) is required to be more than 1.

Furthermore, the combustion gas having a small specific weight, which is collected in the vicinity of the central axis B as is aforementioned, cannot move easily towards the unburned mixture having a large specific weight located around the combustion gas, since the combustion gas is acted upon by an action of pushing said combustion gas back towards the central axis B due to the buoyancy created based on the centrifugal force difference of the two above-mentioned specific weights. Consequently, the combustion gas cannot easily spread outwards, thus completion of the combustion in the subsidiary combustion chamber 8 is delayed compared with the case wherein the air-fuel mixture is not swirled in the subsidiary combustion chamber 8. As a result of this, a high velocity burning jet can continue to be injected until the time the combustion in the main combustion chamber 5 has been completed, and thus completion of the combustion in the main combustion chamber 5 is quickened. In addition, the combustion in the subsidiary combustion chamber 8 is relaxed, thus preventing the creation of a combustion noise.

As is apparent from the above descriptions, the air-fuel mixture in the subsidiary combustion chamber 8 is ignited in the vicinity of the central axis B in which the speed of the air-fuel is nearly equal to zero. Consequently, the range of an air-fuel ratio of a mixture, in which the mixture can be ignited becomes wider.

The first subsidiary chamber 8a may be provided with a single connecting passage or more than three connecting passages instead of providing only two connecting passages 9 and 10. Furthermore, a fixed position of the subsidiary chamber component 7 to the cylinder head 3 and a jet injecting direction of the connecting passages 9 and 10 are selected so that the high velocity burning jet is widely spread over the entire space of the main combustion chamber 5. Consequently, the subsidiary chamber component 7 may be arranged on the cylinder head 3 on the axis of the piston 2.

According to the present invention, a high velocity burning jet can continue to be injected until the combustion in the main combustion chamber has been completed, an injection of the unburned mixture from the subsidiary combustion chamber can be prevented, a combustion noise can be prevented, and the ease of ignition can be extremely improved.

What is claimed is:

1. An internal combustion engine comprising:

a cylinder having a cylinder block and a cylinder head fixed onto said cylinder block, a piston reciprocally movable in said cylinder block, a main combustion chamber formed between a top surface of said piston and an inner surface of said cylinder head, means to supply fuel directly only to said main combustion chamber, said cylinder head having therein a subsidiary combustion chamber symmetrically extending about an axis, said subsidiary combustion chamber having a circumferential inner wall including a raised annular portion defining a restricted opening interconnecting and of smaller diameter than a substantially spherically shaped first portion of said subsidiary combustion chamber located near the main combustion chamber and a second portion of said subsidiary combustion chamber located further from the main combustion chamber than the first portion, wherein said restricted opening is the only opening in said second portion of said subsidiary combustion chamber, the volume of said first portion of said subsidiary chamber is smaller than the volume of said second portion of said subsidiary chamber, the ratio of the diameter of said annular portion to the diameter of said second portion of said subsidiary chamber is less than 0.8, and the diameter of the second portion of the subsidiary chamber is greater than the axial length of said second portion, passage means connecting the main combustion chamber and the subsidiary combustion chamber through the circumferential wall of said first portion of said subsidiary chamber, the inner end of said passage means being tangent to the circumferential wall of said first portion of said subsidiary chamber and extending downwardly and outwardly to the main combustion chamber to create a swirling motion of a combustible mixture in the first and second portions of said subsidiary combustion chamber, and a spark plug having a spark gap located in the vicinity of said symmetrical axis and the second portion of said subsidiary combustion chamber, said restricted opening allowing the flow of a combustion gas from said second portion to said first portion, both of which portions are of greater diameter than the restricted opening, said combustion gas being collected in the vicinity of said symmetrical axis after said combustible mixture is ignited, while said restricted opening prevents outflow of unburned mixture from said second portion to said first portion, said unburned mixture being collected on the peripheral region in said second portion removed from said symmetrical axis due to the centrifugal force caused by said swirling motion of said combustible mixture.

2. An internal combustion engine as recited in claim 1, in which said passage means comprises a plurality of holes, wherein said holes are equiangularly arranged about said symmetrical axis of said subsidiary combustion chamber.

3. An internal combustion engine as recited in claim 1, wherein said spark gap of said spark plug is located on said symmetrical axis in the end of the second portion of said subsidiary chamber most remote from said first portion.

* * * * *